US008038537B2

(12) United States Patent
Mastropietro et al.

(10) Patent No.: US 8,038,537 B2
(45) Date of Patent: Oct. 18, 2011

(54) SYSTEMS AND METHODS FOR EVALUATING A GAMING OUTCOME USING A GAME RULES SCRIPT

(75) Inventors: Michael Mastropietro, Chicago, IL (US); Paul McInerny, Chicago, IL (US); Brian Veenker, Aurora, IL (US); Matthew J. Ward, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 1313 days.

(21) Appl. No.: 10/661,101

(22) Filed: Sep. 12, 2003

(65) Prior Publication Data

US 2005/0059450 A1 Mar. 17, 2005

(51) Int. Cl.
*A63F 13/00* (2006.01)

(52) U.S. Cl. ................. 463/43; 463/23; 463/16; 463/20

(58) Field of Classification Search .................... 463/13, 463/23, 43, 16, 20

See application file for complete search history.

(56) References Cited

U.S. PATENT DOCUMENTS

2002/0036380 A1* 3/2002 Perrie et al. .................. 273/146
2004/0053682 A1* 3/2004 Nelson et al. .................. 463/25
2004/0214628 A1* 10/2004 Boyd et al. ...................... 463/20
2005/0059453 A1* 3/2005 Benbrahim et al. ............ 463/16

OTHER PUBLICATIONS

Mikohn Gaming Introduces Yahtzee Slot Machine, Feb. 23, 2000 http://grochowski.casinocitytimes.com/articles/795.html.*

* cited by examiner

*Primary Examiner* — Arthur O. Hall
*Assistant Examiner* — Jeffrey Wong
(74) *Attorney, Agent, or Firm* — Schwegman, Lundberg & Woessner, P.A.

(57) ABSTRACT

Systems and methods utilize a game rules script that defines a set of winning outcomes. The games rules script may be parsed into a game rules data structure that may be utilized by a gaming application. The gaming system generates a game outcome, and uses the game rules data structure defined by the game rules script to determine if the game outcome matches at least one winning outcome in the set of winning outcomes defined in the script.

37 Claims, 9 Drawing Sheets

FIG. 2B
202.1
210
204
ROYAL FLUSH
STRAIGHT FLUSH
SEE FULL PAYTABLE
FULL HOUSE
FLUSH
STRAIGHT
3 of a KIND
2 PAIR
JACKS or BETTER
FOUR'S OR BETTER
Good Luck!
CREDITS
TOTAL BET
PAID
DRAW

SYSTEMS AND METHODS FOR EVALUATING A GAMING OUTCOME USING A GAME RULES SCRIPT

FIELD

The present invention relates generally to software for gaming machines, and more particularly to evaluating gaming outcomes using a game rules script.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2003, WMS Gaming, Inc. All Rights Reserved.

BACKGROUND

Today's gaming terminal typically comprises a computerized system controlling a video display or reels that provide wagering games such as slots, video card games (poker, blackjack etc.), video keno, video bingo, video pachinko and other games typical in the gaming industry.

In order to prevent players from becoming bored, new versions of wagering games, and alterations to existing games are constantly being developed. In the case of card and dice games, the new rules associated with the game also requires the development of specialized evaluation software that is executed during the game to determine if the outcome generated by the game is a winning outcome. For example, for a video poker game, an evaluation routine is executed during game play that decides if the player's hand matches a winning hand.

It is typically long, complex, and difficult to produce, test and debug a new evaluation routine that implements new gaming rules. Additionally, evaluation routines are generally inflexible. For example, an evaluation routine written for a "Jacks or Better" 5-card draw game will not work for a 7-card stud game. Generally the evaluation routine needs to be totally re-written every time a new game is developed.

In view of the above-mentioned problems and concerns, there is a need in the art for the present invention.

SUMMARY

The above-mentioned shortcomings, disadvantages and problems are addressed by the present invention, which will be understood by reading and studying the following specification.

One aspect of the systems and methods is a game rules script that defines a set of winning outcomes. The games rules script may be parsed into a game rules data structure that may be utilized by a gaming application. The gaming system generates a game outcome, and uses the game rules data structure defined by the game rules script to determine if the game outcome matches at least one winning outcome in the set of winning outcomes defined in the script.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Operating Environment

Figure 1:
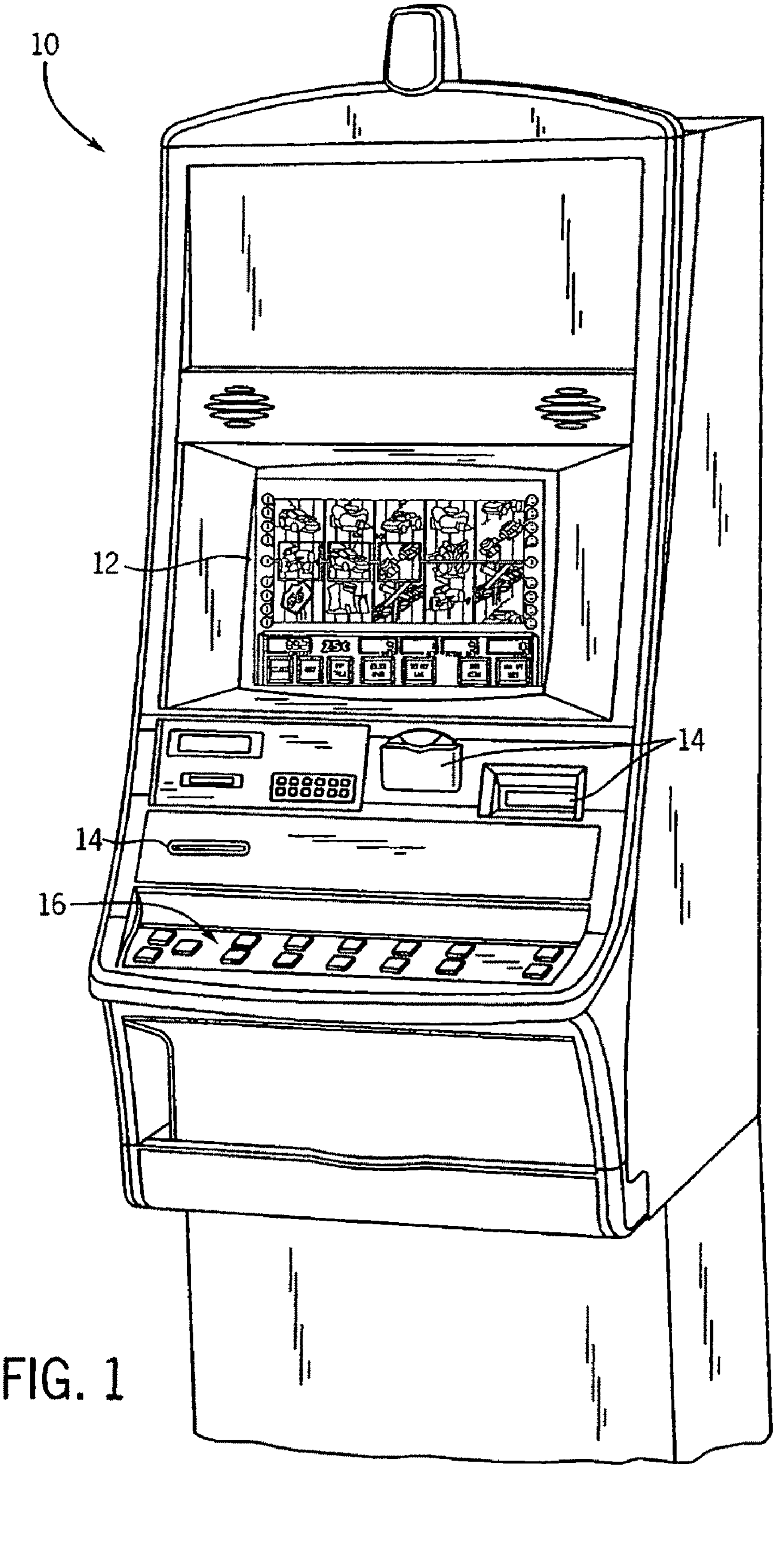
FIG. 1 is a perspective view of a gaming machine embodying the present invention.

FIG. 1 illustrates an exemplary gaming machine 10 in which embodiments of the invention may be implemented. In some embodiments, gaming machine 10 is operable to conduct a wagering game. These wagering games may include card based games such as video poker, or other types of wagering games such as a video dice game (e.g. a Yahtzee® like dice game). If based in video, the gaming machine 10 includes a video display 12 such as a cathode ray tube (CRT), liquid crystal display (LCD), plasma, or other type of video display known in the art. A touch screen preferably overlies the display 12. In the illustrated embodiment, the gaming machine 10 is an "upright" version in which the display 12 is oriented vertically relative to a player. Alternatively, the gaming machine may be a "slant-top" version in which the display 12 is slanted at about a thirty-degree angle toward the player.

The gaming machine 10 includes a plurality of possible credit receiving mechanisms 14 for receiving credits to be used for placing wagers in the game. The credit receiving mechanisms 14 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

In some embodiments, the gaming machine 10 includes a user interface comprising a plurality of push-buttons 16, the above-noted touch screen, and other possible devices. The plurality of push-buttons 16 may, for example, include one or more "bet" buttons for wagering, a "play" button for commencing play, a "collect" button for cashing out, a "help" button for viewing a help screen, a "pay table" button for viewing the pay table(s), and a "call attendant" button for calling an attendant. Additional game specific buttons may be provided to facilitate play of the specific game executed on the machine. The touch screen may define touch keys for implementing many of the same functions as the push-buttons. Additionally, in the case of video poker, the touch screen may implement a card identification function to indicate which cards a player desires to keep for the next round. Other possible user interface devices include a keyboard and a pointing device such as a mouse or trackball.

A processor controls operation of the gaming machine 10. In response to receiving a wager and a command to initiate play, the processor randomly selects a game outcome from a plurality of possible outcomes and causes the display 12 to depict indicia representative of the selected game outcome. In the case of slots for example mechanical or simulated slot reels are rotated and stopped to place symbols on the reels in visual association with one or more pay lines. If the selected outcome is one of the winning outcomes defined by a pay table, the CPU awards the player with a number of credits associated with the winning outcome.

Figure 2A:
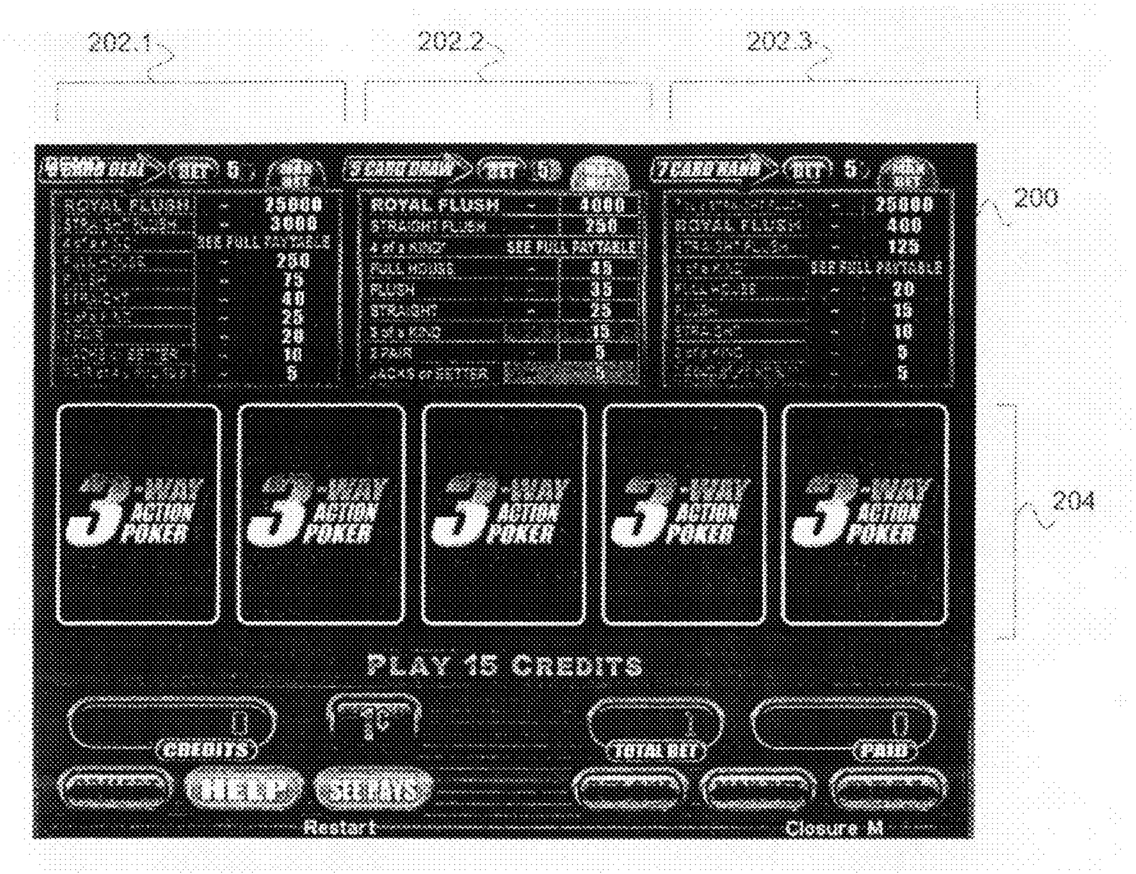
FIGS. 2A-2D are illustrations of exemplary screen outputs for a gaming machine incorporating embodiments of the invention.

FIGS. 2A-2D are illustrations of exemplary screen outputs for a gaming machine incorporating embodiments of the invention. The screen output illustrated in FIGS. 2A-2D may be presented on display 12 of gaming machine 10. FIG. 2A illustrates an exemplary initial screen 200 for a game "3-Way Action Poker" available from WMS Gaming Inc. of Chicago, Ill. In some embodiments, the initial screen 200 includes game details 202 and game element display 204. Game element display 204 is an area of the screen that displays game elements. In the exemplary screen shown, the game element is a playing card. However, in alternative embodiments, the game elements may also comprise dice, for example in a Yahtzee® like game.

Game details 202 provides information regarding one of three available games, "5 Card Deal" (202.1), "5 Card Draw" (202.2), and "7 Card Hand" (202.3). The information presented for each game includes various poker hands that may be formed from cards presented in game element display 204, and the payout for the corresponding poker hand.

Figure 2B:

FIG. 2B provides an exemplary screen output 210 presented when the "5 Card Deal" game of an embodiment of the invention is selected by a player. In some embodiments, game details 202.1 is highlighted to indicate that "5 Card Deal" is the current game being played. Game elements 204 presents a set of playing cards representing a game outcome that may be evaluated according to the systems and methods described below.

Figure 2C:
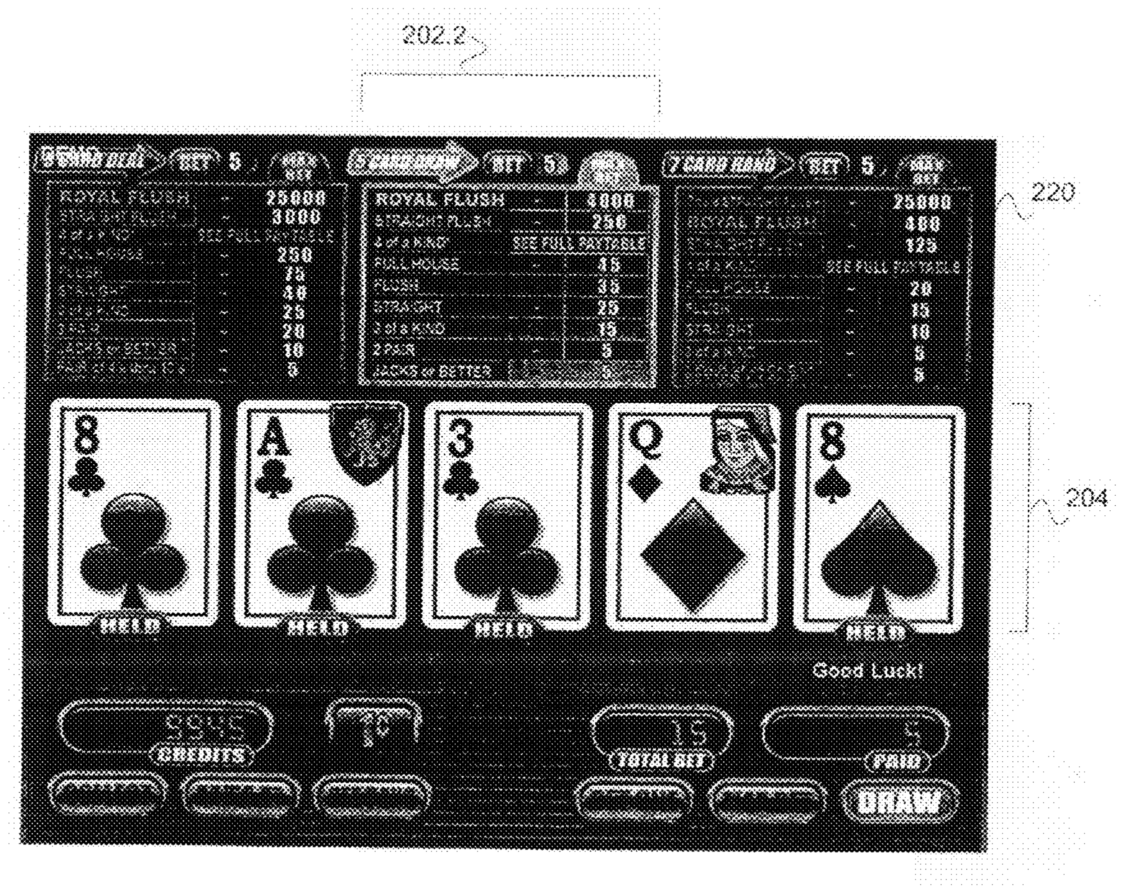

FIG. 2C provides an exemplary screen output 220 presented when the "5 Card Draw" game of an embodiment of the invention is selected by a player. In some embodiments, game details 202.2 is highlighted to indicate that "5 Card Draw" is the current game being played. Game elements 204 presents a set of playing cards representing a game outcome that may be evaluated according to the systems and methods described below.

Figure 2D:
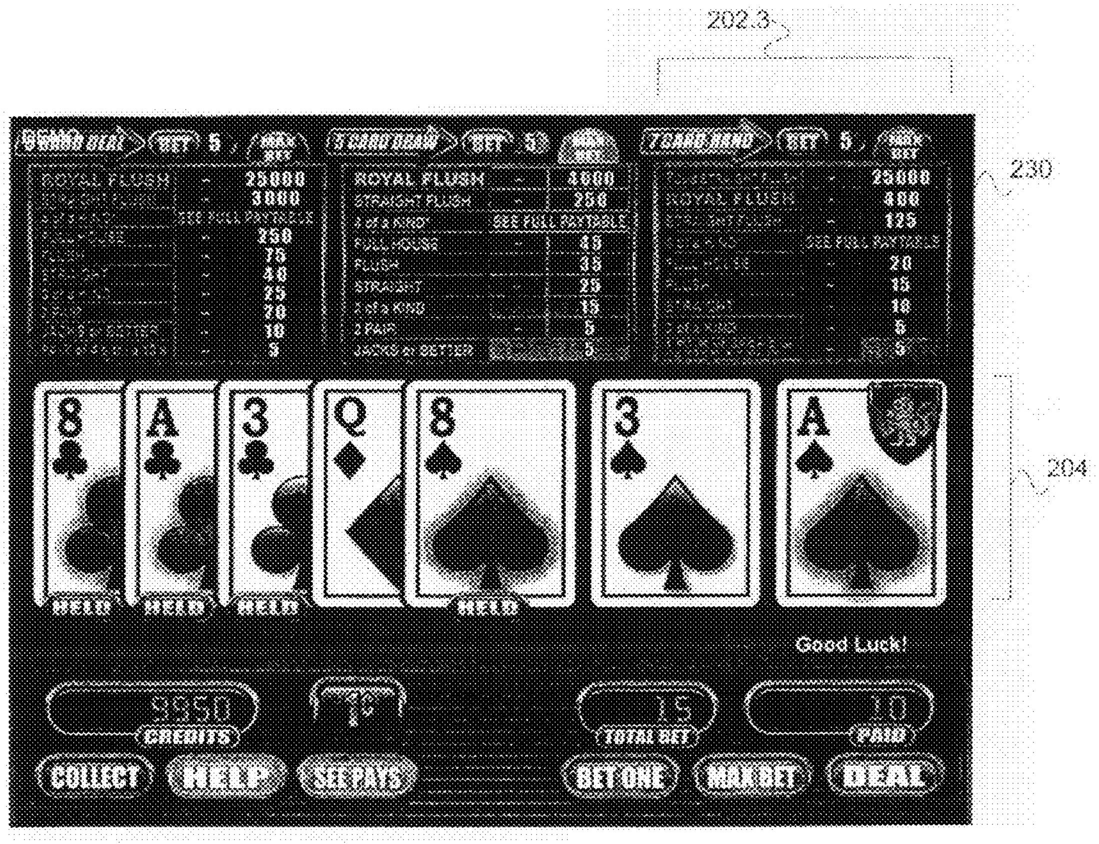

FIG. 2D provides an exemplary screen output 230 presented when the "7 Card Hand" game of an embodiment of the invention is selected by a player. In some embodiments, game details 202.3 is highlighted to indicate that "7 Card Hand" is the current game being played. Game elements 204 presents a set of playing cards representing a game outcome that may be evaluated according to the systems and methods described below.

Figure 3:
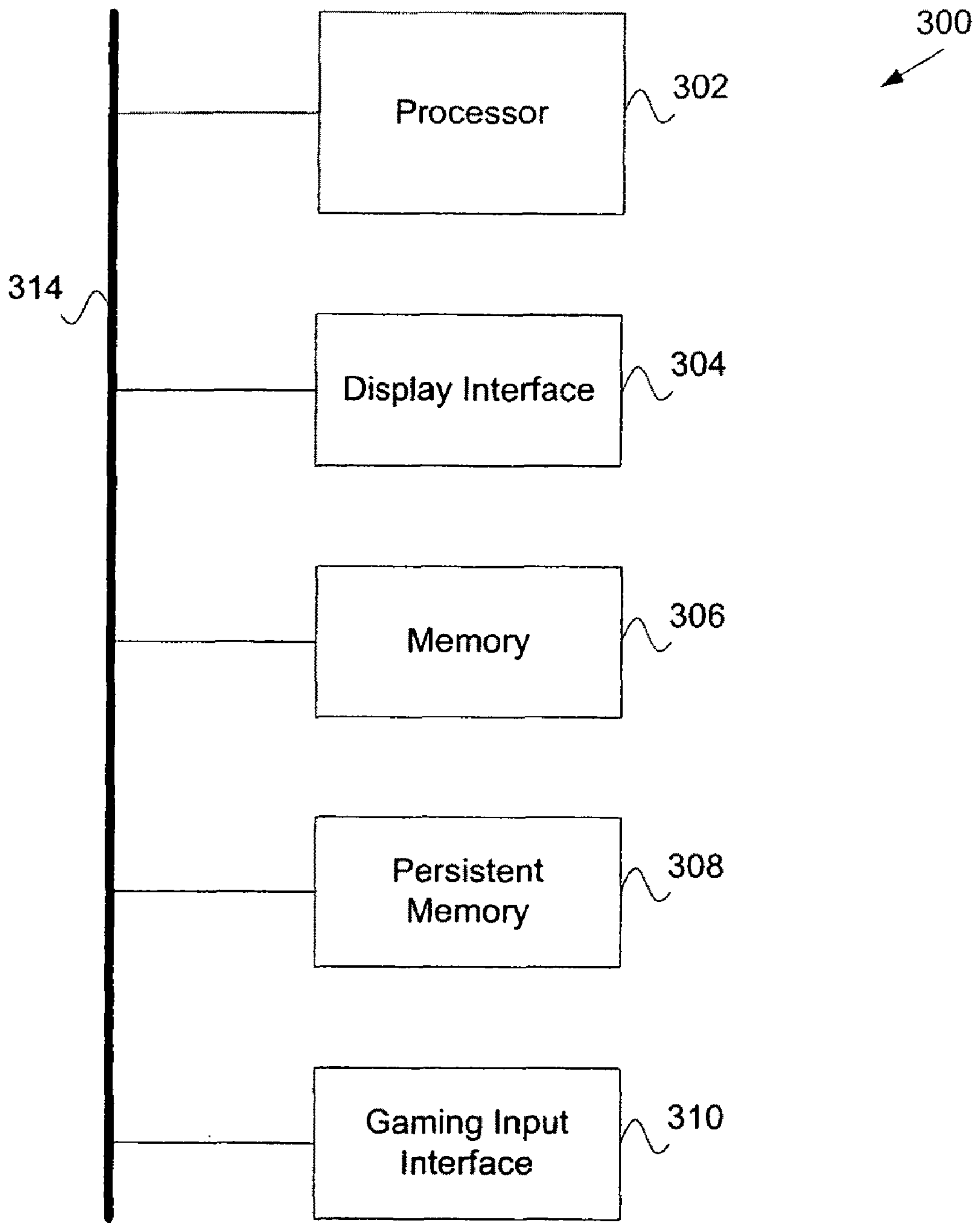
FIG. 3 is a block diagram of a gaming control system suitable for operating the gaming machine in FIG. 1.

FIG. 3 is a block diagram of a gaming control system 300 suitable for controlling the operation of the gaming machine 10 in FIG. 1. In some embodiments of the invention, gaming control system 300 includes one or more processors 302, one or more display interfaces 304, memory 306, persistent memory 308, and gaming input interface 310 all communicably coupled via a bus 314. Processor 302 executes operating system and gaming software stored in memories 306 and 308. In some embodiments, processor 302 may be a processor from the Intel Pentium® family of processors, however the invention is not limited to any particular processor. Memory 306 may be a random-access memory capable of storing instructions and data used by an operating system and gaming application.

Persistent memory 308 is a memory that may be used to store operating system and gaming software for loading and execution by processor 302. Persistent memory 308 may be a ROM, a flash memory, a hard drive, a CD-ROM, DVD-ROM or other type of memory able to persistently store software and data.

Display interface 304 operates to control one or more displays such as display 12 of gaming machine 10.

Gaming input interface 310 operates to provide an input interface to the various input devices on a gaming machine 10, such as buttons or touch screen elements.

Figure 4:
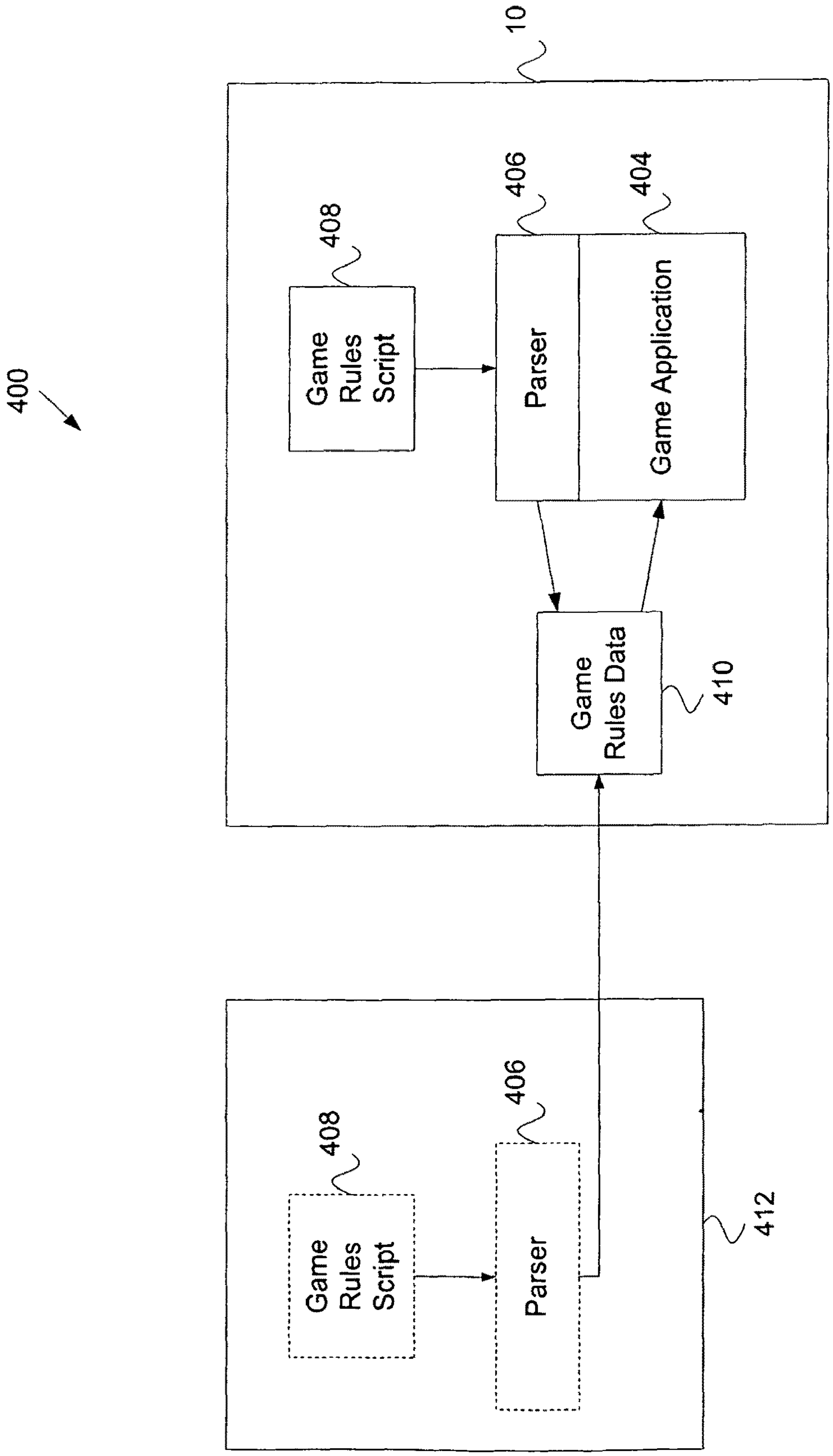
FIG. 4 is a block diagram of a software environment for a gaming control system suitable for operating the gaming machine in FIG. 1.

FIG. 4 is a block diagram of a software environment 400 for a gaming control system according to embodiments of the invention. Software environment 400 may operate within the gaming machine 10 in FIG. 1 on gaming control system 300 in FIG. 3. In some embodiments, software environment 400 includes a game application 404, parser 406, game rules script 408 and game rules data 410. Game application 404 comprises software that controls the play of a game such as a video poker game or a video Yahtzee® game. Game application 404 typically include component software such as random number generators, display components that render game elements such as playing cards or dice, and input components that respond to button presses or touch screen presses.

Game rules script 408 comprises a file containing a script that provides rules for playing one or more games. In some embodiments, game rules script 408 includes rules that determine which outcomes generated by game application 404 are considered winning outcomes, or outcomes that will trigger a "bonus" round or game segment. In some embodiments, a winning outcome provides a payout based on an initial wager.

The rules in game script 408 are written in a grammar that may define matching or comparison relationship between game elements. For example, in embodiments where the game elements are playing cards, the rules define matching or comparison rules for the rank and/or suits of cards that are winning combinations. In embodiments where the game elements are dice, the rules typically are based on matches or comparisons of the rank on exposed faces of the dice.

In embodiments where the grammar defines rules for a card game such as a poker hand grammar, the grammar may describe a poker hand in generic terms. For example, to express the concept that "a pair is any card in a hand, matched with any other card in the hand" the grammar may include the following rules:

"Pair"

1) choose any card 2) match a card with the same rank as card #1

Additionally, to express the concept that "a flush is when five cards that have the same suit", the grammar may include the following rules:

"Flush"

1) choose any card 2) match a card with the same suit as card #1

3) match a card with the same suit as card #1

4) match a card with the same suit as card #1

5) match a card with the same suit as card #1

Further, to express the concept that "a straight is when each card is one rank greater than the previous card", the grammar may include the following rules:

"Straight"

1) choose any card 2) match a card with the next rank over card #1

3) match a card with the next rank over card #2

4) match a card with the next rank over card #3

5) match a card with the next rank over card #4

In some embodiments, game rules scripts 408 may be organized as a hierarchical script where the hierarchy includes statements that define a game, statements that define winning combinations for the game, and statements that define the rules for each winning combination.

In some embodiments, the game script comprises statements that include the following tokens or reserved words having the indicated meaning:

| | |
|---|---|
| ComboSet | Starts the definition of a game |
| Combo | Starts the definition of a winning combination |
| WinId | Identifier for a winning combination |
| WinAmount | Payout Amount for a winning combination |
| RuleSet | Starts the definition of a set of one or more rules for a winning combination |
| Match | Starts the definition of a matching rule |
| Rank | Indicates that a game element rank value will be used in rule |
| Value | Indicates that a numeric token is used as a value rather than a game element number |
| SameAs | Indicates that the match must be an exact match |
| Suit | Indicates that a game element suit is used in a rule |
| OneMoreThan | Indicates that the statement is a match if the rank of a game element is one more than the rank of the compared game element. |

Rules and rule statements may be terminated by placing a termination character such as "/" in front of the token or reserved word. For example, "Match" indicates the start of a match rule, while "/Match" indicates the end of the rule. Additionally, in some embodiments, tokens or reserved words may be placed within brackets such as "<" and ">" characters. However, the present invention is not limited to any particular rule or statement termination character or string of characters. An exemplary game rule script for a five card poker game is provided in Appendix A.

Ranks in some embodiments are numeric values from 1-13 where 1 represents an ace, 2-10 represent the corresponding face value of the cards, and 11, 12 and 13 represent the jack, queen and king respectively.

In some embodiments, if a numeric value is used that is not within a rank statement, then the numeric value represents the order of a game element in a sequence of game elements. For example, the number 0 represents the first card in the sequence, the number 1 the second and so forth.

Additionally, in some embodiments, the game rules script may contain statements that provide card definitions. These statements include:

| | |
|---|---|
| CardData | Starts the definition of a card |
| Suit | Indicates the suit for a card |
| Rank | Indicates the rank of a card |
| Matches | Indicates that the card may be a wild card, and starts the definition of how the card matches a rank and/or suit of another card. |

Exemplary card definitions are also provided in Appendix A.

It should be noted that the present invention is not limited to the tokens or reserved words noted above, and that other representations for the concepts above may be used and are within the scope of the present invention.

In some embodiments, game application 404 includes a parser 406. Parser 406 operates to read a game rules script 408 and parses the components of a game rules script into game rules data 410. Techniques for parsing are known in the art. Game rules data 410 represents one or more data structures that correspond to the rules and data in game rules script 408, and are placed in a form that may be more readily processed by game application 404.

In some embodiments, the script and parser reside on game machine 10 and are executed when a game application 404 is started. In alternative embodiments, the script and parser may reside on a separate computer system 412. The script is parsed into rules data that may then be transferred to a game machine 10.

Figure 5A:
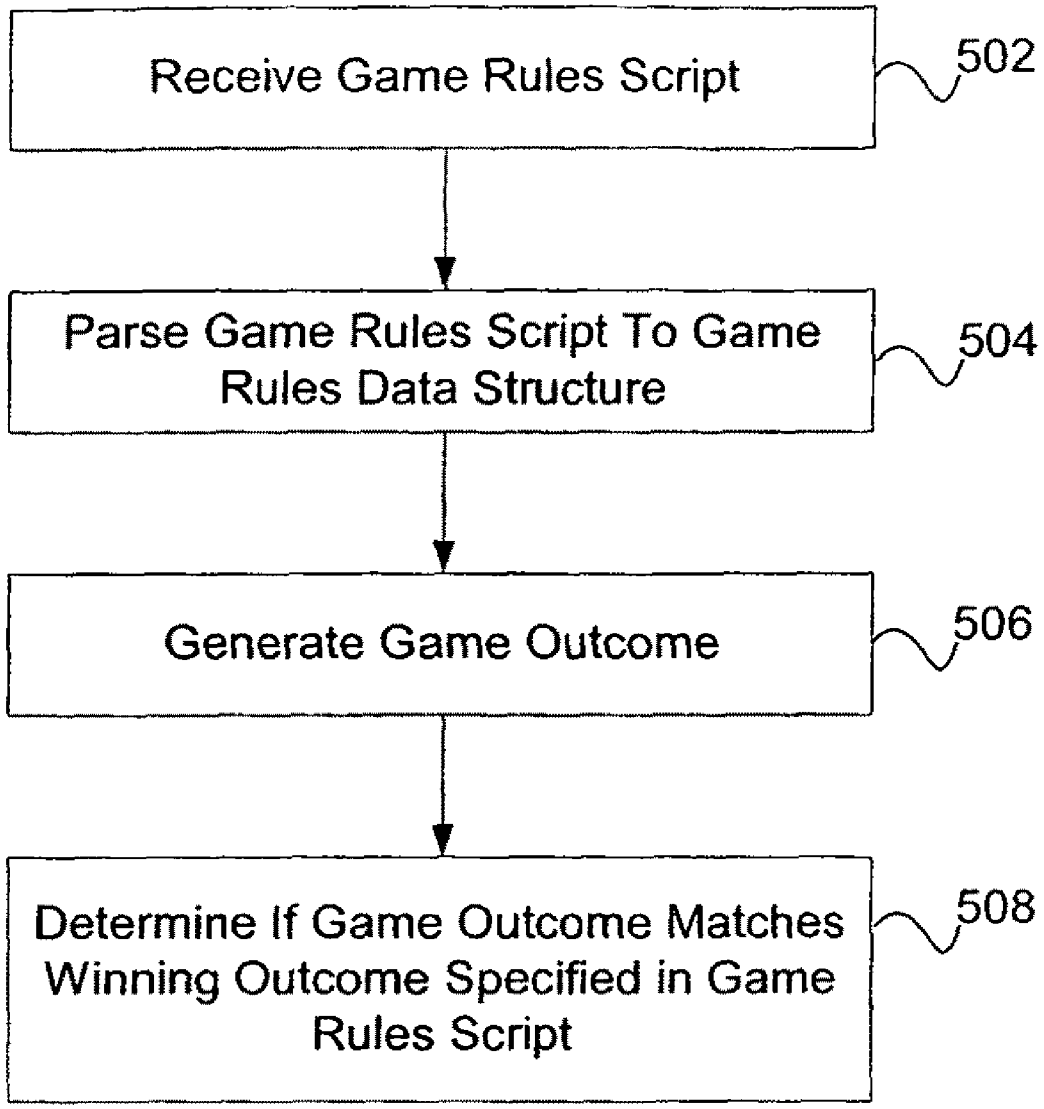
FIGS. 5A-B are flowcharts illustrating methods for evaluating a gaming outcome based on a game rules script.
Figure 5B:
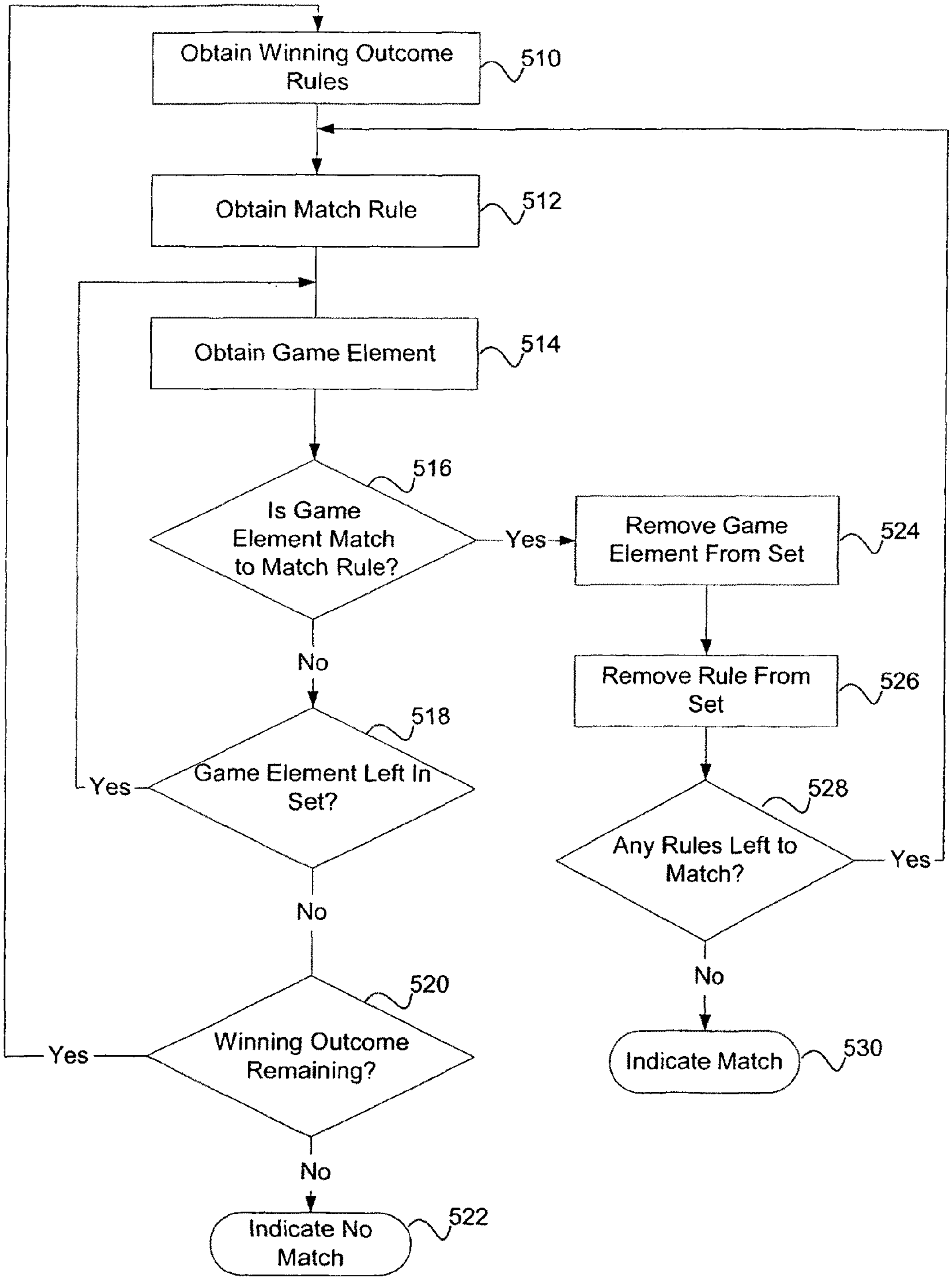

FIGS. 5A and 5B are flowcharts illustrating methods for evaluating a game outcome using a script according various embodiments of the invention. The methods to be performed by the operating environment may constitute at least in part computer programs made up of computer-executable instructions. Describing the methods by reference to a flowchart enables one skilled in the art to develop such programs including such instructions to carry out the methods on suitable computers (the processor or processors of the computer executing the instructions from computer-readable media). The methods illustrated in FIGS. 5A-5B are inclusive of acts that may be taken by an operating environment executing an exemplary embodiment of the invention.

FIG. 5A illustrates a method for using a game rules script to determine if a generated outcome is a winning outcome. The method starts when a system executing the method, such as a game application 404, receives a game rules script (block 502). In some embodiments, the game rules script is formatted as described above and provides rules for determining winning outcomes for one or more games. The game rules script is then parsed into game rules data (block 504).

Next, the system generates a game outcome (block 506). The game outcome is typically a randomly generated sequence of one or more game elements. The game elements may be playing cards and/or dice. The present invention is not limited to any particular type of game element. Additionally, in the case of playing cards, the ranks, suits, and number of cards are not limited to standard decks and may include arbitrarily assigned ranks, suits and/or number of cards. Similarly, in the case of dice, the present invention is not limited to six sided dice, the dice may have an arbitrary number of sides.

The system then determines if the generated game outcome matches one or more of the winning combinations specified in the game rules script as represented in the game rules data (block 508). In some embodiments, a payout amount is associated with a winning combination, and upon a match, the payout amount is credited to the player.

FIG. 5B provides further details on a method according to embodiments of the invention for determining a match between a generated outcome and a winning combination. The method begins when a game application obtains a set of rules for a winning outcome from the set of rules for the currently executing game (block 510). The system also obtains a match rule from the set of match rules for the winning outcome (block 512). Additionally, the system obtains a game element from the set of game elements for the generated outcome (block 514).

Next, the system determines if the current game element matches the current match rule (block 516). In other words, the system checks to see if the current game element satisfies the current rule. If the game element matches the rule, then the current game element is temporarily removed from the game element set to form a reduced game element set (block 524). Additionally, the current rule is temporarily removed from the current rule set to form a reduced rule set (block 526). The system then checks to see if there are any rules left in the rules set (block 528). If no rules are left in the rules set, then every rule in the winning combination rules set has been satisfied and the generated outcome has matched a winning outcome (block 530). Otherwise, the system returns to block 512 to obtain the next rule from the now reduced rule set. It should be noted that other mechanism besides removing a rule or game element from a set could be used. For example, the data structure representing the game element or rule could have an attribute indicating whether the game element or rule has already been matched, and the system could check the attribute for each rule to see if all rules for a winning combination have been matched to determine if a winning combination exists.

If the current game element does not match any rule, the system checks to see if any game elements remain to be checked in the set of game elements (block 518). If game elements remain, the system returns to block 514 to obtain the next game element. Otherwise, if no game element remain, the system checks to see if any winning outcomes remain to be checked (block 520). If so, the system resets the set of game elements to the generated game elements and returns to block 510 to compare the next winning outcome rules to the set of game elements. Otherwise, if no winning outcomes remain, the generated game elements did not match any winning outcomes (block 522).

In some embodiments, the method illustrated in FIG. 5B may be coded using functions that are called in a recursive manner. For example, block 514 to 530 may be included in a matching function that may be recursively called by a function that will be referred to as "MatchHand". Assume that "playerHand" is a set of cards in a game outcome that need to be evaluated, and "ruleSet" is a current set of rules for a winning outcome. In pseudocode form, blocks 514 to 530 may be expressed as:

```
MatchHand(playerHand, ruleSet)
{
    For each card in playerHand
    {
        if current card matches the first rule in ruleSet
        {
            MatchHand(playerHand - currentCard, ruleSet - firstrule)
        }
    }
}
```

A particular example of the execution of the above-described methods will now be presented. Assume that a player's hand comprises an ace, three fives, and a king, which will be represented as the set [A, 5, 5, K, 5]. Further assume that the current rule represents a three of a kind which will be represented as the set [match any card, match a card with the same rank as card #1, match a card with the same rank as #1]

On the first pass, the first card matches the first rule ("match any card") so the method removes the first card from the set to form [5, 5, K, 5], removes the first rule from the set to form [match a card with the same rank as card #1, match a card with the same rank as card #1], and tries to match the next rule with the remaining cards.

On this pass none of the cards match the next rule ("match a card with the same rank as card #1"). So, the method comes back to the first rule and attempts to find another card that matches. Card #2 (a 5) matches the first rule ("match any card"). The method again attempts to match the second rule, but now the set of remaining cards is different: [A, 5, K, 5], and the current rules set comprises [match a card with the same rank as card #1, match a card with the same rank as card #1]. This time, the method finds a card that matches the second rule ("match a card with the same rank as card #1"), so it removes the matching card to form [A, K, 5] and goes on to the last rule: [match a card with the same rank as card #1]. The last rule is matched by the last card, so it is determined that the hand matches a "three of a kind."

In some embodiments, wild cards that match multiple aspects of a card may be supported. In the simple case, a wild card may be defined to match any other card. As described above, wild cards may be defined in a more complex manner so that the matching functions may use the card definition to match only a particular suit or a particular rank.

Conclusion

Systems and methods for evaluating a gaming outcome using a game rules script have been disclosed. The systems and methods described provide advantages over previous systems. For example, one an evaluator has been developed, the same evaluator can be used for a variety for games that use the same type of game elements. Additionally, game rule scripts that match winning hands can be developed by anyone (mathematicians, for example) trained in the rule script grammar. Previous methods typically require a software engineer with expertise in programming languages to develop an evaluation routine. Further, rule scripts may be developed quickly. Finally, rule scripts may be developed that easily handle "wild cards." Previous systems typically require a complex alteration to handle wilds (and that alteration would only work for that particular game).

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

Appendix A

I. Exemplary Card Definitions

```
<CardData> ; definition of one card
    <Suit> SPADES </Suit>
    <Rank> JACK </Suit>
</CardData>
```

II. Exemplary Wild Card Definition Matching Any Card and Any Suit

```
<CardData>
    <Suit> SPECIAL </Suit>
    <Rank> WILD </Rank>
    <Matches>
        <Suit> ANY </Suit>
        <Rank> ANY </Rank>
    </Matches>
</CardData>
```

III. Exemplary Wild Card Definition Matching Any Rank In Spades Suit

```
<CardData>
    <Suit> SPADES </Suit>
    <Rank> WILD </Rank>
    <Matches>
        <Suit> SPADES </Suit>
        <Rank> ANY </Rank>
    <Matches>
</CardData>
```

IV. Exemplary Game Rules Script

```
<ComboSet>
    <Combo>
        <WinID> 1 </WinID> ; royal flush
        <WinAmount> 800 </WinAmount>
        <RuleSet>
            <Match> <Rank> <Value> 1 </Value> </Rank> </Match> ; match ace
            <Match> <Suit> <SameAs> 0 </SameAs> </Suit> <Rank> <Value> 10
</Value>        </Rank> </Match> ; matches if rank is 10
            <Match> <Suit> <SameAs> 0 </SameAs> </Suit> <Rank> <OneMoreThan> 1
</OneMoreThan> </Rank> </Match> ; matches if rank is one more than second
card
            <Match> <Suit> <SameAs> 0 </SameAs> </Suit> <Rank> <OneMoreThan> 2
</OneMoreThan> </Rank> </Match> ; matches if rank is one more than third
card
            <Match> <Suit> <SameAs> 0 </SameAs> </Suit> <Rank> <OneMoreThan> 3
</OneMoreThan> </Rank> </Match> ; matches if rank is one more than fourth
card
        </RuleSet>
    </Combo>
    <Combo>
        <WinID> 5 </WinID> ; straight flush
        <WinAmount> 50 </WinAmount>
        <RuleSet>
            <Match> </Match> ; match any card
            <Match> <Suit> <SameAs> 0 </SameAs> </Suit> <Rank> <OneMoreThan> 0
</OneMoreThan> </Rank> </Match> ; matches if rank is one more than first
card
            <Match> <Suit> <SameAs> 0 </SameAs> </Suit> <Rank> <OneMoreThan> 1
</OneMoreThan> </Rank> </Match> ; matches if rank is one more than second
card
            <Match> <Suit> <SameAs> 0 </SameAs> </Suit> <Rank> <OneMoreThan> 2
</OneMoreThan> </Rank> </Match> ; matches if rank is one more than third
card
            <Match> <Suit> <SameAs> 0 </SameAs> </Suit> <Rank> <OneMoreThan> 3
</OneMoreThan> </Rank> </Match> ; matches if rank is one more than fourth
card
        </RuleSet>
    </Combo>
    <Combo>
        <WinID> 3 </WinID> ; four aces
        <WinAmount> 160 </WinAmount>
        <RuleSet>
            <Match> <Rank> <Value> 1 </Value> </Rank> </Match> ; match ace
            <Match> <Rank> <Value> 1 </Value> </Rank> </Match>
```

-continued

```
            <Match> <Rank> <Value> 1 </Value> </Rank> </Match>
            <Match> <Rank> <Value> 1 </Value> </Rank> </Match>
        </RuleSet>
    </Combo>
    <Combo>
        <WinID> 13 </WinID> ; four 2's
        <WinAmount> 80 </WinAmount>
        <RuleSet>
            <Match> <Rank> <Value> 2 </Value> </Rank> </Match> ; match 2
            <Match> <Rank> <Value> 2 </Value> </Rank> </Match>
            <Match> <Rank> <Value> 2 </Value> </Rank> </Match>
            <Match> <Rank> <Value> 2 </Value> </Rank> </Match>
        </RuleSet>
    </Combo>
    <Combo>
        <WinID> 13 </WinID> ; four 3's
        <WinAmount> 80 </WinAmount>
        <RuleSet>
            <Match> <Rank> <Value> 3 </Value> </Rank> </Match> ; match 3
            <Match> <Rank> <Value> 3 </Value> </Rank> </Match>
            <Match> <Rank> <Value> 3 </Value> </Rank> </Match>
            <Match> <Rank> <Value> 3 </Value> </Rank> </Match>
        </RuleSet>
    </Combo>
    <Combo>
        <WinID> 13 </WinID> ; four 4's
        <WinAmount> 80 </WinAmount>
        <RuleSet>
            <Match> <Rank> <Value> 4 </Value> </Rank> </Match> ; match 4
            <Match> <Rank> <Value> 4 </Value> </Rank> </Match>
            <Match> <Rank> <Value> 4 </Value> </Rank> </Match>
            <Match> <Rank> <Value> 4 </Value> </Rank> </Match>
        </RuleSet>
    </Combo>
    <Combo>
        <WinID> 14 </WinID> ; four 5
        <WinAmount> 50 </WinAmount>
        <RuleSet>
            <Match> <Rank> <Value> 5 </Value> </Rank> </Match> ; match 5
            <Match> <Rank> <Value> 5 </Value> </Rank> </Match>
            <Match> <Rank> <Value> 5 </Value> </Rank> </Match>
            <Match> <Rank> <Value> 5 </Value> </Rank> </Match>
        </RuleSet>
    </Combo>
    <Combo>
        <WinID> 14 </WinID> ; four 6
        <WinAmount> 50 </WinAmount>
        <RuleSet>
            <Match> <Rank> <Value> 6 </Value> </Rank> </Match> ; match 6
            <Match> <Rank> <Value> 6 </Value> </Rank> </Match>
            <Match> <Rank> <Value> 6 </Value> </Rank> </Match>
            <Match> <Rank> <Value> 6 </Value> </Rank> </Match>
        </RuleSet>
    </Combo>
    <Combo>
        <WinID> 14 </WinID> ; four 7
        <WinAmount> 50 </WinAmount>
        <RuleSet>
            <Match> <Rank> <Value> 7 </Value> </Rank> </Match> ; match 7
            <Match> <Rank> <Value> 7 </Value> </Rank> </Match>
            <Match> <Rank> <Value> 7 </Value> </Rank> </Match>
            <Match> <Rank> <Value> 7 </Value> </Rank> </Match>
        </RuleSet>
    </Combo>
    <Combo>
        <WinID> 14 </WinID> ; four 8
        <WinAmount> 50 </WinAmount>
        <RuleSet>
            <Match> <Rank> <Value> 8 </Value> </Rank> </Match> ; match 8
            <Match> <Rank> <Value> 8 </Value> </Rank> </Match>
            <Match> <Rank> <Value> 8 </Value> </Rank> </Match>
            <Match> <Rank> <Value> 8 </Value> </Rank> </Match>
        </RuleSet>
    </Combo>
    <Combo>
        <WinID> 14 </WinID> ; four 9
        <WinAmount> 50 </WinAmount>
        <RuleSet>
            <Match> <Rank> <Value> 9 </Value> </Rank> </Match> ; match 9
            <Match> <Rank> <Value> 9 </Value> </Rank> </Match>
```

-continued

```
            <Match> <Rank> <Value> 9 </Value> </Rank> </Match>
            <Match> <Rank> <Value> 9 </Value> </Rank> </Match>
        </RuleSet>
    </Combo>
    <Combo>
        <WinID> 14 </WinID> ; four 10
        <WinAmount> 50 </WinAmount>
        <RuleSet>
            <Match> <Rank> <Value> 10 </Value> </Rank> </Match> ; match 10
            <Match> <Rank> <Value> 10 </Value> </Rank> </Match>
            <Match> <Rank> <Value> 10 </Value> </Rank> </Match>
            <Match> <Rank> <Value> 10 </Value> </Rank> </Match>
        </RuleSet>
    </Combo>
    <Combo>
        <WinID> 14 </WinID> ; four Jack
        <WinAmount> 50 </WinAmount>
        <RuleSet>
            <Match> <Rank> <Value> 11 </Value> </Rank> </Match> ; match Jack
            <Match> <Rank> <Value> 11 </Value> </Rank> </Match>
            <Match> <Rank> <Value> 11 </Value> </Rank> </Match>
            <Match> <Rank> <Value> 11 </Value> </Rank> </Match>
        </RuleSet>
    </Combo>
    <Combo>
        <WinID> 14 </WinID> ; four Queen
        <WinAmount> 50 </WinAmount>
        <RuleSet>
            <Match> <Rank> <Value> 12 </Value> </Rank> </Match> ; match Queen
            <Match> <Rank> <Value> 12 </Value> </Rank> </Match>
            <Match> <Rank> <Value> 12 </Value> </Rank> </Match>
            <Match> <Rank> <Value> 12 </Value> </Rank> </Match>
        </RuleSet>
    </Combo>
    <Combo>
        <WinID> 14 </WinID> ; four King
        <WinAmount> 50 </WinAmount>
        <RuleSet>
            <Match> <Rank> <Value> 13 </Value> </Rank> </Match> ; match King
            <Match> <Rank> <Value> 13 </Value> </Rank> </Match>
            <Match> <Rank> <Value> 13 </Value> </Rank> </Match>
            <Match> <Rank> <Value> 13 </Value> </Rank> </Match>
        </RuleSet>
    </Combo>
    <Combo>
        <WinID> 7 </WinID> ; full house
        <WinAmount> 9 </WinAmount>
        <RuleSet>
            <Match> </Match> ; match any card
            <Match> <Rank> <SameAs> 0 </SameAs> </Rank> </Match> ; matches if
rank is same as first card
            <Match> </Match> ; match any card
            <Match> <Rank> <SameAs> 2 </SameAs> </Rank> </Match> ; matches if
rank is same as third card
            <Match> <Rank> <SameAs> 2 </SameAs> </Rank> </Match> ; matches if
rank is same as third card
        </RuleSet>
    </Combo>
    <Combo>
        <WinID> 8 </WinID> ; flush
        <WinAmount> 7 </WinAmount>
        <RuleSet>
            <Match> </Match> ; match any card
            <Match> <Suit> <SameAs> 0 </SameAs> </Suit> </Match> ; matches if
suit is same as first card
            <Match> <Suit> <SameAs> 0 </SameAs> </Suit> </Match> ; matches if
suit is same as first card
            <Match> <Suit> <SameAs> 0 </SameAs> </Suit> </Match> ; matches if
suit is same as first card
            <Match> <Suit> <SameAs> 0 </SameAs> </Suit> </Match> ; matches if
suit is same as first card
        </RuleSet>
    </Combo>
    <Combo>
        <WinID> 9 </WinID> ; straight
        <WinAmount> 5 </WinAmount>
        <RuleSet>
            <Match> </Match> ; match any card
            <Match> <Rank> <OneMoreThan> 0 </OneMoreThan> </Rank> </Match> ;
```

-continued

```
matches if rank is one more than first card
            <Match> <Rank> <OneMoreThan> 1 </OneMoreThan> </Rank> </Match> ;
matches if rank is one more than second card
            <Match> <Rank> <OneMoreThan> 2 </OneMoreThan> </Rank> </Match> ;
matches if rank is one more than third card
            <Match> <Rank> <OneMoreThan> 3 </OneMoreThan> </Rank> </Match> ;
matches if rank is one more than fourth card
        </RuleSet>
    </Combo>
    <Combo>
        <WinID> 9 </WinID> ; straight with ace high
        <WinAmount> 5 </WinAmount>
        <RuleSet>
            <Match> <Rank> <Value> 1 </Value> </Rank> </Match> ; match ace
            <Match> <Rank> <Value> 10 </Value> </Rank> </Match> ; matches if
rank is 10
            <Match> <Rank> <OneMoreThan> 1 </OneMoreThan> </Rank> </Match> ;
matches if rank is one more than second card
            <Match> <Rank> <OneMoreThan> 2 </OneMoreThan> </Rank> </Match> ;
matches if rank is one more than third card
            <Match> <Rank> <OneMoreThan> 3 </OneMoreThan> </Rank> </Match> ;
matches if rank is one more than fourth card
        </RuleSet>
    </Combo>
    <Combo>
        <WinID> 10 </WinID> ; three of a kind
        <WinAmount> 3 </WinAmount>
        <RuleSet>
            <Match> </Match> ; match any card
            <Match> <Rank> <SameAs> 0 </SameAs> </Rank> </Match> ; matches if
rank is same as first card
            <Match> <Rank> <SameAs> 0 </SameAs> </Rank> </Match> ; matches if
rank is same as first card
        </RuleSet>
    </Combo>
    <Combo>
        <WinID> 11 </WinID> ; two pair
        <WinAmount> 1 </WinAmount>
        <RuleSet>
            <Match> </Match> ; match any card
            <Match> <Rank> <SameAs> 0 </SameAs> </Rank> </Match> ; matches if
rank is same as first card
            <Match> </Match> ; match any card
            <Match> <Rank> <SameAs> 2 </SameAs> </Rank> </Match> ; matches if
rank is same as third card
        </RuleSet>
    </Combo>
    <Combo>
        <WinID> 12 </WinID> ; pair of jacks
        <WinAmount> 1 </WinAmount>
        <RuleSet>
            <Match> <Rank> <Value> 11 </Value> </Rank> </Match>
            <Match> <Rank> <SameAs> 0 </SameAs> </Rank> </Match> ; matches if
rank is same as first card
        </RuleSet>
    </Combo>
    <Combo>
        <WinID> 12 </WinID> ; pair of queens
        <WinAmount> 1 </WinAmount>
        <RuleSet>
            <Match> <Rank> <Value> 12 </Value> </Rank> </Match>
            <Match> <Rank> <SameAs> 0 </SameAs> </Rank> </Match> ; matches if
rank is same as first card
        </RuleSet>
    </Combo>
    <Combo>
        <WinID> 12 </WinID> ; pair of Kings
        <WinAmount> 1 </WinAmount>
        <RuleSet>
            <Match> <Rank> <Value> 13 </Value> </Rank> </Match>
            <Match> <Rank> <SameAs> 0 </SameAs> </Rank> </Match> ; matches if
rank is same as first card
        </RuleSet>
    </Combo>
    <Combo>
        <WinID> 12 </WinID> ; pair of aces
        <WinAmount> 1 </WinAmount>
        <RuleSet>
            <Match> <Rank> <Value> 1 </Value> </Rank> </Match>
            <Match> <Rank> <SameAs> 0 </SameAs> </Rank> </Match> ; matches if
```

-continued

```
rank is same as first card
          </RuleSet>
     </Combo>
</ComboSet>
```

What is claimed is:

1. A method for evaluating a game outcome on a gaming machine, the method comprising:

receiving during a runtime of a wagering game a game rules script, the game rules script comprising text specifying a set of displayable game elements used in the wagering game, the text further defining one or more rules to determine a set of one or more winning outcomes in terms of one or more of the set of displayable game elements;

parsing the games rules script into a game rules data structure;

generating a game outcome for display on the gaming machine, the game outcome including selected elements of the set of displayable game elements; and determining if the game outcome matches at least one winning outcome in the set of winning outcomes in accordance with evaluation of the selected elements against the one or more rules provided by the game rules data structure by repeating, until all rules are compared:

comparing the selected elements against the one or more rules provided by the game rules data structure; and removing a matching rule from the one or more rules and removing matching elements from the selected elements responsive to matching of the matching elements and the matching rule.

2. The method of claim 1, wherein the set of winning outcomes comprise winning outcomes for a card game.

3. The method of claim 2, wherein the card game comprises a poker card game.

4. The method of claim 1, wherein the set of winning outcomes comprise winning outcomes for a dice game.

5. The method of claim 4, wherein the dice game comprises a poker-style dice game with five dice.

6. The method of claim 1, wherein each winning outcome in the set of winning outcomes is defined by a set of match rules, and wherein determining if the game outcome matches at least one winning outcome includes determining if each match rule in the set of match rules for a winning outcome matches at least one of the selected elements.

7. The method of claim 1, wherein the displayable game elements comprise one or more playing cards.

8. The method of claim 1, wherein the displayable game elements comprise one or more dice.

9. A method for evaluating a game outcome on a gaming machine, the method comprising:

receiving during a runtime of a wagering game a game rules script, the game rules script comprising text specifying a set of displayable game elements for a wagering game, the text further defining one or more rules to determine a set of one or more winning outcomes in terms of one or more of the set of displayable game elements;

parsing the games rules script into a game rules data structure;

generating a game outcome for display on the gaming machine; and determining if the game outcome matches at least one winning outcome in the set of winning outcomes in accordance with the game rules data structure;

wherein each winning outcome in the set of winning outcomes comprises a set of match rules, wherein the game outcome includes one or more displayable game elements from the set of displayable game elements, and wherein determining if the game outcome matches at least one winning outcome includes determining if each match rule in the set of match rules for a winning outcome matches at least one displayable game element;

wherein determining if each match rule in the set of match rules for a winning outcome matches at least one displayable game element includes the tasks of:

a. comparing a displayable game element with a match rule in the set of match rules;

b. if the displayable game element matches a match rule, then: removing the displayable game element from the set of displayable game elements to form a reduced set of displayable gaming elements, removing the match rule from the set of match rules to form a reduced set of match rules, executing tasks a and b on the reduced set of displayable gaming elements and the reduced set of match rules; and c. determining that each match rule has been matched when no rules remain in the reduced set of match rules.

10. A non-transitory computer-readable medium having disposed thereon a game rules script, the game rules script comprising:

text defining a set of displayable game elements used in a wagering game;

text defining a set of winning outcomes for a game; and text defining a set of rules for each winning outcome in the set of winning outcomes for the game, the rules expressed in terms of the text defining the set of displayable game elements for the wagering game;

wherein during a separate data processing step a game outcome is compared to the set of rules to determine if the game outcome matches the set of rules, by evaluating a set of displayed game elements from the game outcome to combinations of displayable game elements in the set of rules repeating, until all rules are compared:

a comparison of elements of the game outcome against the set of rules; and a removal of a matching rule from the set of rules and a removal of matching elements from the elements of the game outcome responsive to matching of the matching elements and the matching rule.

11. The non-transitory computer-readable medium of claim 10, wherein the set of rules include a rank matching rule.

12. The non-transitory computer-readable medium of claim 11, wherein the rank matching rule defines an exact match to a rank.

13. The non-transitory computer-readable medium of claim 11, wherein the rank matching rule defines a numerical comparison to a rank.

14. The non-transitory computer-readable medium of claim 10, wherein the set of rules includes a suit matching rule.

15. The non-transitory computer-readable medium of claim 10, wherein the set of rules includes a wild card definition rule.

16. The non-transitory computer-readable medium of claim 10, wherein each winning outcome in the set of winning outcomes includes a payout amount.

17. A computerized gaming system comprising:

a processor;

a memory;

a game rules script, said game rules script comprising text defining a set of displayable game elements used in the wagering game, the text further including a set of winning outcomes for a game, each of the set of winning outcomes including a set of match rules expressed in terms of the set of displayable game elements;

a parser operable to parse the game rules script into a game rules data structure; and a gaming application operable in connection with the processor and the memory to:

generate a game outcome, the game outcome including selected elements of the set of displayable game elements;

determine if the game outcome matches at least one winning outcome in the set of winning outcomes in accordance with evaluation of the selected elements against the one or more rules provided by the game rules data structure by repeating, until all rules are compared:

a comparison of the selected elements against the set of match rules provided by the game rules data structure; and a removal of a matching rule from the set of match rules and a removal of matching elements from the selected elements responsive to matching of the matching elements and the matching rule.

18. The computerized gaming system of claim 17, wherein the set of winning outcomes comprise winning outcomes for a card game.

19. The computerized gaming system of claim 18, wherein the card game comprises a poker card game.

20. The computerized gaming system of claim 17, wherein the set of winning outcomes comprise winning outcomes for a dice game.

21. The computerized gaming system of claim 20, wherein the dice game comprises a poker-style dice game with five dice.

22. The computerized gaming system of claim 17, wherein each winning outcome in the set of winning outcomes is defined by a set of match rules, and wherein the gaming application is further operable to determine if each match rule in the set of match rules for a winning outcome matches at least one of the selected elements.

23. The computerized gaming system of claim 17, wherein the displayable game elements comprise one or more playing cards.

24. The computerized gaming system of claim 17, wherein the displayable game elements comprise one or more dice.

25. A computerized gaming system comprising:

a processor;

a memory;

a game rules script, said game rules script comprising text defining a set of displayable game elements for a wagering game, the text further including a set of winning outcomes for a game, each of the set of winning outcomes including a set of match rules expressed in terms of the set of displayable game elements;

a parser operable to parse the game rules script into a game rules data structure; and a gaming application operable in connection with the processor and the memory to:

generate a game outcome;

determine if the game outcome matches at least one winning outcome in the set of winning outcomes in accordance with the game rules data structure;

wherein the gaming application is further operable to:

a. compare a displayable game element with a match rule in the set of match rules;

b. if the displayable game element matches a match rule, then: remove the displayable game element from the set of displayable game elements to form a reduced set of displayable game elements, remove the match rule from the set of match rules to form a reduced set of match rules, execute tasks a and b on the reduced set of displayable game elements and the reduced set of match rules; and c. determining that each match rule has been matched when no rules remain in the reduced set of match rules.

26. A non-transitory computer-readable medium having computer executable instructions stored thereon for performing operations for evaluating a game outcome on a gaming machine, the operations comprising:

receiving a game rules script, the game rules script comprising text defining a set of displayable game elements used in the wagering game, the text further defining one or more rules to determine a set of winning outcomes in terms of one or more of the set of displayable game elements;

parsing the games rules script into a game rules data structure;

generating a game outcome, the game outcome including selected elements of the set of displayable game elements; and determining if the game outcome matches at least one winning outcome in the set of winning outcomes in accordance with evaluation of the selected elements against the one or more rules provided by the game rules data structure by repeating, until all rules are compared:

comparing the selected elements against the one or more rules provided by the game rules data structure; and removing a matching rule from the one or more rules and removing matching elements from the selected elements responsive to matching of the matching elements and the matching rule.

27. The non-transitory computer-readable medium of claim 26, wherein the set of winning outcomes comprise winning outcomes for a card game.

28. The non-transitory computer-readable medium of claim 27, wherein the card game comprises a poker card game.

29. The non-transitory computer-readable medium of claim 26, wherein the set of winning outcomes comprise winning outcomes for a dice game.

30. The non-transitory computer-readable medium of claim 26, wherein the dice game comprises a poker-style dice game with five dice.

31. The non-transitory computer-readable medium of claim 26, wherein each winning outcome in the set of winning outcomes is defined by a set of match rules, and wherein determining if the game outcome matches at least one winning outcome includes determining if each match rule in the set of match rules for a winning outcome matches at least one of the selected elements.

32. The non-transitory computer-readable medium of claim 26, wherein the displayable game elements comprise one or more playing cards.

33. The non-transitory computer-readable medium of claim 26, wherein the displayable game elements comprise one or more dice.

34. A non-transitory computer-readable medium having computer executable instructions stored thereon for performing operations for evaluating a game outcome on a gaming machine, the operations comprising:

receiving a game rules script, the game rules script comprising text defining a set of displayable game elements for a wagering game, the text further defining one or more rules to determine a set of winning outcomes in terms of one or more of the set of displayable game elements;

parsing the games rules script into a game rules data structure;

generating a game outcome; and determining if the game outcome matches at least one winning outcome in the set of winning outcomes in accordance with the game rules data structure;

wherein each winning outcome in the set of winning outcomes comprises a set of match rules, wherein the game outcome includes one or more displayable game elements from the set of displayable game elements, and wherein determining if the game outcome matches at least one winning outcome includes determining if each match rule in the set of match rules for a winning outcome matches at least one displayable game element;

wherein determining if each match rule in the set of match rules for a winning outcome matches at least one displayable game element includes the tasks of:

a. comparing a displayable game element with a match rule in the set of match rules;

b. if the displayable game element matches a match rule, then:

removing the displayable game element from the set of game elements to form a reduced set of displayable game elements, removing the match rule from the set of match rules to form a reduced set of match rules, executing tasks a and b on the reduced set of displayable game elements and the reduced set of match rules; and c. determining that each match rule has been matched when no rules remain in the reduced set of match rules.

35. The method of claim 1, wherein each winning outcome in the set of winning outcomes is associated with a payout amount.

36. The computerized gaming system of claim 17, wherein each winning outcome in the set of winning outcomes is associated with a payout amount.

37. The non-transitory computer-readable medium of claim 26, wherein each winning outcome in the set of winning outcomes is associated with a payout amount.

* * * * *